(12) United States Patent
Reinhardt

(10) Patent No.: US 9,755,867 B2
(45) Date of Patent: Sep. 5, 2017

(54) METHOD AND A SYSTEM FOR CONTROLLING A PLURALITY OF ELECTRONIC COMPONENTS ARBITRARILY ASSIGNABLE TO A PLURALITY OF INTEGRATED CIRCUITS OF A MOBILE COMMUNICATIONS DEVICE

(71) Applicant: INTEL IP CORPORATION, Santa Clara, CA (US)

(72) Inventor: Steffen Reinhardt, Nuremburg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/223,521

(22) Filed: Jul. 29, 2016

(65) Prior Publication Data
US 2017/0063583 A1 Mar. 2, 2017

(30) Foreign Application Priority Data
Aug. 31, 2015 (DE) .......................... 10 2015 114 489

(51) Int. Cl.
*H04B 1/40* (2015.01)
*H04L 27/00* (2006.01)
*H04B 1/401* (2015.01)
*H04W 88/06* (2009.01)

(52) U.S. Cl.
CPC ......... *H04L 27/0002* (2013.01); *H04B 1/401* (2013.01); *H04W 88/06* (2013.01)

(58) Field of Classification Search
CPC ................................................ H04L 27/0002
See application file for complete search history.

(56) References Cited

U.S. PATENT DOCUMENTS

| 6,249,686 | B1 * | 6/2001 | Dvorkin | ............... H04B 1/28 455/232.1 |
|---|---|---|---|---|
| 2008/0051129 | A1 | 2/2008 | Abe et al. | |
| 2009/0207764 | A1 | 8/2009 | Fukamachi et al. | |
| 2013/0173960 | A1 * | 7/2013 | Barthel | ............... H04L 12/2697 714/27 |
| 2014/0194157 | A1 | 7/2014 | Ezekiel et al. | |

* cited by examiner

*Primary Examiner* — Hsin-Chun Liao
(74) *Attorney, Agent, or Firm* — Eschweiler & Potashnik, LLC

(57) ABSTRACT

A system for controlling a plurality of electronic components arbitrarily assignable to a plurality of integrated circuits of a mobile communications device is provided. The integrated circuits are capable of processing a radio frequency signal. The system includes a control module configured to allocate a subset of the plurality of electronic components constituting at least one signal path between an integrated circuit of the plurality of integrated circuits and an antenna element of the mobile communications device. The control module is further configured to assign the at least one signal path to the integrated circuit, and to transfer control of at least a part of the subset of the plurality of electronic components constituting the at least one signal path to the integrated circuit.

24 Claims, 4 Drawing Sheets

METHOD AND A SYSTEM FOR CONTROLLING A PLURALITY OF ELECTRONIC COMPONENTS ARBITRARILY ASSIGNABLE TO A PLURALITY OF INTEGRATED CIRCUITS OF A MOBILE COMMUNICATIONS DEVICE

CROSS REFERENCE TO RELATED APPLICATIONS

This application claims priority to German Patent Application number 10 2015 114 489.1, filed on Aug. 31, 2015, and is hereby incorporated by reference in its entirety.

FIELD

Examples relate to controlling front-end components of a mobile communications device. In particular, examples relate to a method and a system for controlling a plurality of electronic components arbitrarily assignable to a plurality of integrated circuits of a mobile communications device.

BACKGROUND

In a mobile communications device, a Radio Frequency (RF) receive signal may be converted to an equivalent BaseBand (BB) receive signal, and a BB transmit signal may be converted to an equivalent RF transmit signal. The RF is conventionally in the range of several hundred Megahertz (MHz) up to several Gigahertz (GHz) for cellular standards and highly variable due to different frequency bands available in different countries and assigned to different network providers. There may further be frequency division multiple access schemes assigning different frequency resources to different mobile communications devices in a given frequency band.

A Radio Frequency Integrated Circuit (RFIC) may be provided for the BB-RF conversion (and vice versa). The RFIC may include (mainly) analog circuitry and be physically separated (e.g. by means of package) from a (mainly) digital BaseBand Integrated Circuit (BBIC) and an application processor. However, not all analog components of a RF transmit path or a RF receive path may be implementable on the RFIC due to complexity or processing (manufacturing) technology. Moreover, there may be a desire for customization of the RF capabilities. Hence, a plurality of (analog) components (RF front-end components) may be provided separate to the RFIC. For example, one or more antenna switches, duplexers, diplexers, triplexers, frequency filters, Low Noise Amplifiers (LNA), DC-to-DC converters (DCDC) or Power Amplifiers (PA) may be provided separately. Some of these components may be grouped together to more complex front-end modules (e.g. related to supported RF bands).

The RFIC may include one or more Central Processing Units (CPU). The RFIC's CPU may not only control the RFIC internal transmit and/or receive chains. Additionally, the RF front-end components or modules may be configured and controlled by the RFIC. That is, the RFIC may define and control receive and/or transmit paths. For example, an external PA (and its associated DCDC) may be controlled by the RFIC for transmit power control, or an external LNA may be controlled by the RFIC for receive gain control.

The RFIC may allow a clean separation between RF and BB. For example, the BBIC may control the RFIC with an abstract interface, so that the actual implementation of receive and/or transmit paths controlled by the RFIC may be hidden to the BBIC.

With increasing demand on data rate, cellular standards are expanded to transmit and/or receive on multiple frequencies and bands at the same time. For example, support for multi-carrier in the 3G standard of the 3rd Generation Partnership Project (3GPP), carrier aggregation in the 4G standard of the 3GPP, or usage of Multiple Input Multiple Output (MIMO) antennas may be demanded from the mobile communications device. With an increasing number of carriers and an increasing number of antennas per carrier, an increasing number of receive and transmit chains needs to be instantiated in the RFIC. Another factor driving the number of receive and transmit chains may be multi-Subscriber Identity Module (SIM) support. Users demand mobile communications devices supporting more than one SIM, wherein all SIMs are expected to be active in potentially different networks at the same time.

In order to deal with the above requirements, a plurality of transmit and receive chains may be provided (at a same time instant) within the RFIC. However, due to inter-chip frequency coupling or inter-chip interference of different oscillators used for generating different frequencies within the plural receive and transmit chains, only a small number of receive and transmit chains may be implemented on a same die. In order to provide a plurality of transmit and receive paths, a mobile communications device may therefore comprise a plurality of RFICs. For example, the plurality of RFICs and RFIC related resources may be shared between different SIMs.

However, due to the plurality of RFICs, assignment of the various RF front-end components to the RFICs is required. Hence, there may be a desire for intelligent control of a plurality of electronic components arbitrarily assignable to a plurality of integrated circuits of a mobile communications device.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
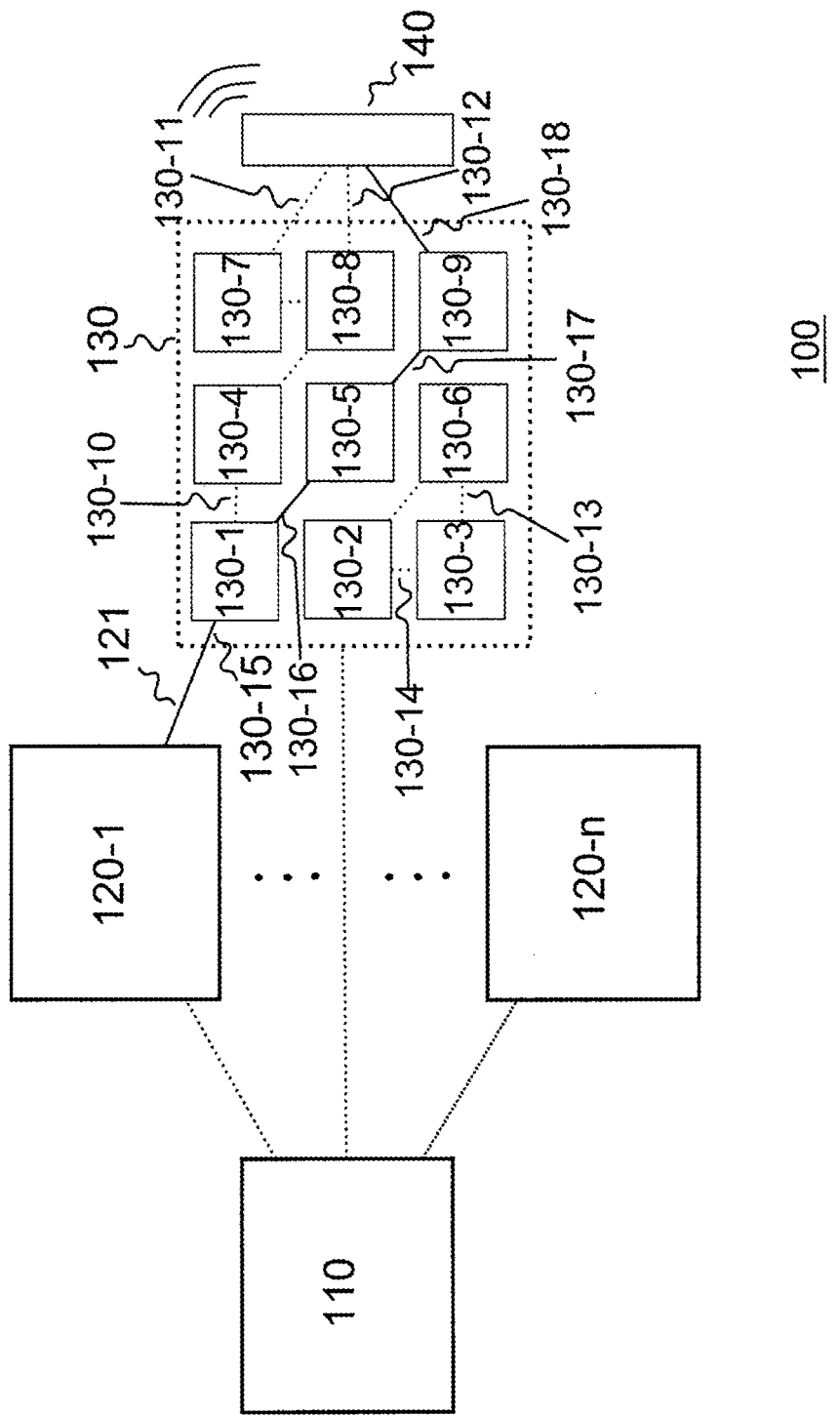
FIG. 1 illustrates an example of a system for controlling a plurality of electronic components arbitrarily assignable to a plurality of integrated circuits of a mobile communications device.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some examples thereof are shown by way of example in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular examples only and is not intended to be limiting of further examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art, unless expressly defined otherwise herein.

In the following, various examples relate to devices (e.g. cell phone, base station) or components (e.g. transmitter, transceiver) of devices used in wireless or mobile communications systems. A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In some examples, the mobile communication system may comprise mobile transceivers, relay station transceivers and base station transceivers. The relay station transceivers and base station transceivers can be composed of one or more central units and one or more remote units.

A mobile transceiver or mobile device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

FIG. 1 illustrates a system 100 for controlling a plurality of electronic components 130. The plurality of electronic components are arbitrarily assignable to a plurality of integrated circuits (IC) 120-1, . . . , 120-n of a mobile communications device. For example, an electronic component 130-2 of the plurality of electronic components 130 is assignable to IC 120-1 or to IC 120-n. The plurality of electronic components 130 may include a plurality of different electronic components. For example, the plurality of electronic components may include amplifiers (e.g. a PA or a LNA), DCDCs, duplexers, diplexers, triplexers, quadriplexers, frequency filter elements (e.g. a band-pass filter, a low-pass filter or a high-pass filter), impedance matching (tuning) networks, or switches for connecting components. Some of the plurality of electronic components 130 may be capable of processing (e.g. receiving or providing) a RF signal. In some examples, the plurality of electronic components 130 may be RF front-end components of the mobile device. In some examples, each of the plurality of integrated circuits is configured to process a RF signal Each or at least some of the plurality of ICs 120-1, . . . , 120-n are capable of processing a RF signal. An IC of the plurality of ICs 120-1, . . . , 120-n may, e.g., be capable of generating a RF signal from a BB signal and/or be capable of generating a BB signal from a RF signal (i.e. the RFIC may be capable of converting a BB signal to a RF signal and vice versa). For example, the IC may comprise one or more mixers for generating the RF signal or the BB signal. In some examples, the plurality of ICs 120-1, . . . , 120-n may be RFICs of the mobile communications device like transmitters, receivers or transceivers.

The system 100 comprises a control module 110 to allocate a subset of the plurality of electronic components 130. The subset of the plurality of components 130 constitutes at least one signal path between one of the plurality of ICs 120-1, . . . , 120-n and an antenna element 140 of the mobile communications device. For example, the subset of the plurality of electronic components may comprise the electronic components 130-1, 130-5, 130-9, 130-15, 130-16, 130-17 and 130-18 in order to allocate a signal path 121 between the IC 120-1 and the antenna element 140. The signal path 121 may, e.g., be a receive path for transmitting a received RF signal from the antenna element 140 to the IC 120-1, or a transmit path for transmitting a generated RF signal form the IC 120-1 to the antenna element 140. The control module 110 may, in some examples, further allocate one or more additional signal paths (not illustrated) between the IC 120-1 and the antenna element 140.

The control module 110 further assigns the at least one signal path 121 to the IC 120-1 of the plurality of ICs 120-1, . . . , 120-n. That is, the electronic components 130-1, 130-5, 130-9, 130-15, 130-16, 130-17 and 130-18 constituting the one signal path 121 are allocated to the IC 120-1.

The control module 110 additionally transfers control (rights) of at least a part of the subset of the plurality of electronic components 130 to the IC 120-1. That is, the control module transfers control of at least part of the electronic components 130-1, 130-5, 130-9, 130-15, 130-16, 130-17 and 130-18 constituting the one signal path 121 to the IC 120-1. In some examples, the control module 110 may transfer control of a fraction of the electronic components 130-1, 130-5, 130-9, 130-15, 130-16, 130-17 and 130-18 constituting the one signal path 121 to the IC 120-1. In some examples, the control module 110 may transfer control of all of the electronic components 130-1, 130-5, 130-9, 130-15, 130-16, 130-17 and 130-18 constituting the one signal path 121 to the IC 120-1.

The control module 110 allows to select a subset of the plurality of electronic components 130, whereas the actual control of at least a part of the selected subset is performed by the IC to which the subset of the plurality of electronic components 130 is assigned. Since the signal path constituted by the subset of the plurality of electronic components is determined by the control module 110, communication between two or more of the plurality of ICs 120-1, . . . , 120-n for negotiating control on individual ones of the plurality of electronic components 130 may be avoided.

Accordingly, an IC of the plurality of ICs 120-1, . . . , 120-n may require no information on current transmit and/or receive resources of the mobile communications device (e.g. an activity of other ones of the plurality of ICs 120-1, . . . , 120-n). Hence, the system 100 may allow to control the plurality of electronic components 130 in an efficient manner.

In some examples, the plurality of electronic components 130 may comprise switches 130-10, 130-11, 130-12, 130-13, 130-14, 130-15, 130-16, 130-17, 130-18 for connecting other electronic components of the plurality of electronic components 130 (switches are indicated by dashed and solid lines connecting the blocks 130-1, . . . , 130-9 indicating further electronic components). For example, the subset of the plurality of electronic components 130 constituting the signal path 121 may comprise a plurality of switches 130-15, 130-16, 130-17, 130-18. The control module 110 controls the plurality of switches 130-15, 130-16, 130-17, 130-18 to connect the remaining electronic components 130-1, 130-5, 130-9 of the subset of the plurality of electronic components 130 to the IC 121 and the antenna element 140. The switches may allow to efficiently and arbitrarily connect other components of the plurality of electronic components 130. Accordingly, one or more signal paths may be efficiently allocated by connecting two or more other electronic components of the plurality of electronic components 130 by switches.

In some examples, the control module 110 may allocate the subset of the plurality of electronic components 130 constituting the signal path 121 based on presently used transmit and receive resources within the mobile communications device. The presently used transmit and receive resources may, e.g., be presently used frequencies for transmitting and receiving RF signals, SIMs presently used within the mobile communications device, communication technologies (e.g. 2G, 3G or LTE) presently used by the mobile communications device, transmission and reception schemes (e.g. multi-carrier, carrier aggregation, Frequency Division Duplex (FDD) or Time Division Duplex (TDD)) presently used within the mobile communications device, or the electronic components of the plurality of electronic components 130 that are presently in use. Allocating or defining the subset of the plurality of electronic components 130 constituting the signal path 121 based on presently used transmit and receive resources within the mobile communications device may allow to select an appropriate subset of the plurality of electronic components 130.

Additionally or alternatively, the control module 110 may allocate the subset of the plurality of electronic components 130 constituting the signal path 121 based on scheduled (planned) transmit and receive resources within the mobile communications device. Allocating the subset of the plurality of electronic components 130 constituting the signal path 121 based on scheduled (future) transmit and receive resources within the mobile communications device may allow to reduce a number of switching processes for allocating signal paths between the plurality of ICs 120-1, . . . , 120-n and the antenna element 140. For example, for the signal path 121 electronic components of the plurality of electronic components 130 may be selected considering future transmit and receive activities within the mobile communications device. Accordingly, the electronic components for the signal path 121 may be selected such that further signal paths for the future transmit and receive activities of the mobile communications device may be configured using the remaining electronic components of the plurality of electronic components 130.

Additionally or alternatively, the control module 110 may allocate the subset of the plurality of electronic components 130 constituting the signal path 121 based on transmit and receive resources supported by the mobile communications device. Allocating the subset of the plurality of electronic components 130 constituting the signal path 121 based on transmit and receive resources supported by the mobile communications device may allow to further reduce the number of switching processes for allocating signal paths between the plurality of ICs 120-1, . . . , 120-n and the antenna element 140.

In other words, the system 100 may allow to control a plurality of electronic components 130 arbitrarily assignable to a plurality of integrated circuits 120-1, . . . , 120-n of a mobile communications device. Therefore, the control module 110 allocates at least one signal path between one of the plurality of ICs (e.g. IC 120-1) and the antenna element 140. Further, the control module assigns the at least one signal path to the one IC, wherein the one IC may control at least a part of the subset of the plurality of electronic components 130 constituting the signal path.

In some examples, the IC 120-1 of the plurality of ICs 120-1, . . . , 120-n may generate a first RF signal for transmission to the environment (the IC 120-1 may e.g. be a transmitter or a transceiver of the mobile communications device). The subset of the plurality of electronic components may thus comprises at least one first amplifier for amplifying the first radio frequency signal. For example, the first amplifier may be a PA. The IC controls a gain of the first amplifier (e.g. a gain of the PA). For example, for 3G, the time constraints on controlling the power of a transmit signal are challenging, so that controlling the gain of the first amplifier directly by the IC 120-1 (i.e. not via a plurality of intermediate components) may allow to reduce a latency between the IC and the amplifier. Hence, the critical time constraints for 3G communication may be satisfied.

In some examples, the IC 120-1 controls the gain of the first amplifier by controlling a supply voltage for the first amplifier. For example, a first supply voltage may be supplied to the first amplifier for a first gain, whereas a higher second supply voltage may be supplied to the first amplifier for a higher second gain. The supply voltage for the first amplifier may be adapted to a mode of operation of the first amplifier (e.g. saturation mode or compression mode).

The subset of the plurality of electronic components 130 may, hence, comprise at least one power supply configured to generate the supply voltage for the first amplifier. The IC 120-1 controls the supply voltage generated by the power supply. For example, the power supply may be a DCDC. In some examples, a voltage provided to an input of the DCDC may thus be controlled by the IC 120-1. In some examples, the voltage provided to the input of the DCDC may further be controlled based on envelope tracking of the first RF signal.

Alternatively or additionally, the IC 120-1 of the plurality of integrated circuits 120-1, . . . , 120-n may receive a second RF from the at least one signal path 121. Therefore, the subset of the plurality of electronic components 130 comprises at least one second amplifier (e.g. a LNA) configured to amplify the second RF signal. The IC 120-1 controls a gain of the second amplifier. For example, the second amplifier may comprise a plurality of gain stages for providing a variable gain, whereas all gain stages shall switch as synchronous as possible. Controlling the second amplifier by the 120-1 may allow to control the second amplifier with high accuracy.

The system 100 may comprise one or more additional optional features corresponding to one or more aspects of the proposed concept or one or more examples described below.

Generally speaking, some examples relate to a means for controlling a plurality of electronic components arbitrarily assignable to a plurality of integrated circuits of a mobile communications device. Each of the plurality of integrated circuits is capable of processing a radio frequency signal. The means comprises a means for allocating a subset of the plurality of electronic components constituting at least one signal path between one of the plurality of integrated circuits and an antenna element of the mobile communications device. The means for allocating is configured to assign the at least one signal path to the one integrated circuit. The means for allocating is further configured to transfer control of at least a part of the subset of the plurality of electronic components constituting the signal path to the one integrated circuit.

Some examples relate to a further means for controlling a plurality of electronic components arbitrarily assignable to a plurality of integrated circuits of a mobile communications device. Each of the plurality of integrated circuits being capable of processing a radio frequency signal. The means comprises a means for allocating a subset of the plurality of electronic components constituting at least one signal path between one of the plurality of integrated circuits and an antenna element of the mobile communications device. The means for allocating is configured to assign the at least one signal path to the one integrated circuit. The one integrated circuit is configured to control at least a part of the subset of the plurality of electronic components constituting the signal path.

The means for allocating may be configured to allocate the subset of the plurality of electronic components based on at least one of presently used transmit and receive resources within the mobile communications device, scheduled transmit and receive resources within the mobile communications device, and transmit and receive resources supported by the mobile communications device.

The means for means for controlling a plurality of electronic components may be implemented by a system for controlling a plurality of electronic components described above or below (e.g. FIG. 1). The means for allocating may be implemented by a control module described above or below (e.g. FIG. 1).

Figure 2:
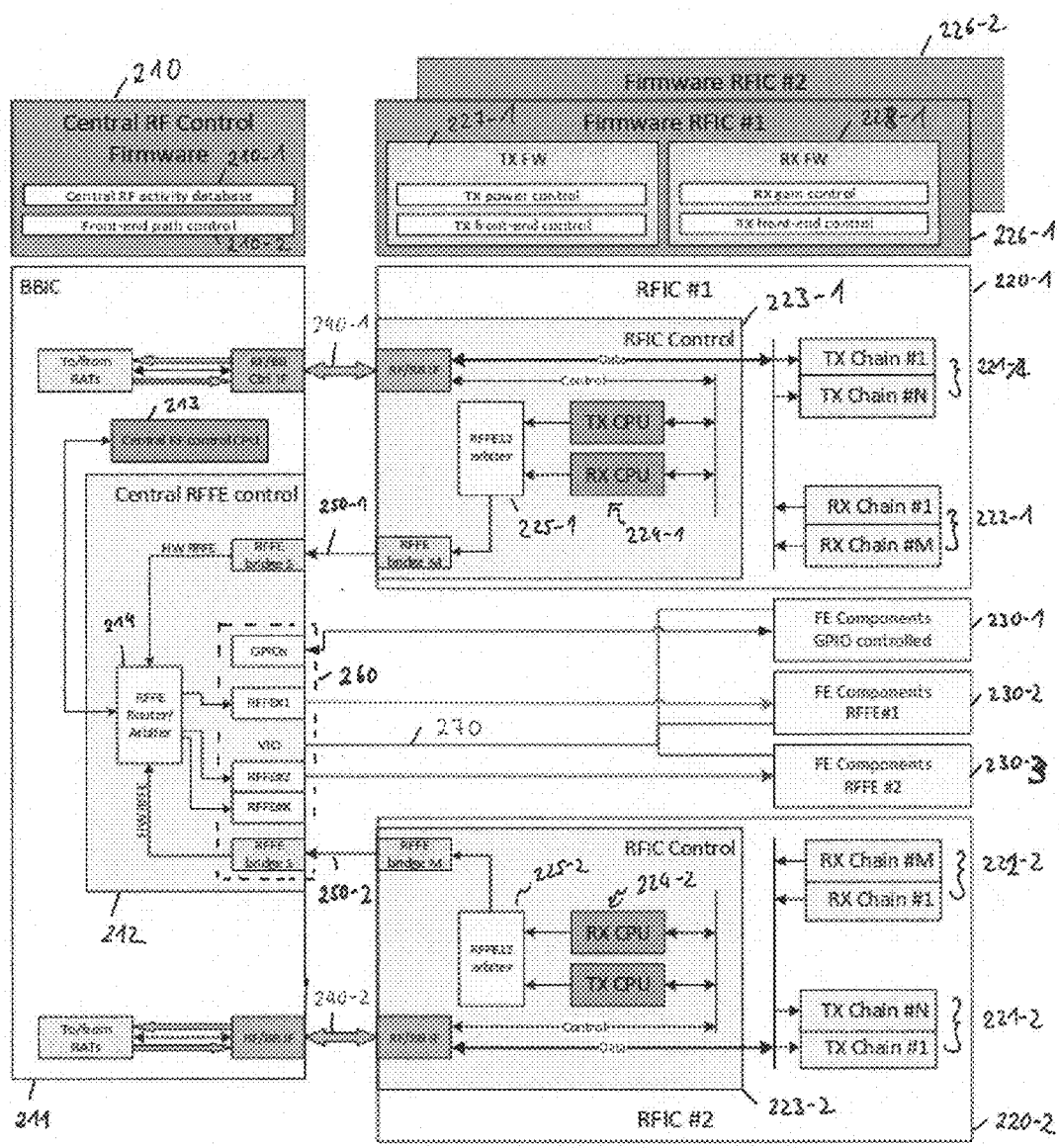
FIG. 2 illustrates an example of a system for controlling a plurality of RF front-end components of a mobile communications device.

In FIG. 2, a system 200 for controlling a plurality of RF Front-End (RFFE) components 230-1, 230-2, and 230-3 of a mobile communications device is illustrated. The system 200 comprises a control module 210 which is implemented as firmware. The firmware is executed by a BBIC 211 of the mobile communications device (e.g. by a dedicated RF control CPU 213). The BBIC 211 is configured to process baseband signals, i.e. signals having a center frequency in the range from zero MHz to several ten MHz.

The system 200 further comprises a first RFIC 220-1 and a second RFIC 220-2. The BBIC 211 controls the RFICs 220-1, 220-2 via respective interfaces 240-1, 240-2. The control module 210 comprises a database module 210-1 which contains information on at least one of presently used, scheduled and supported transmit and receive resources (i.e. transmit and receive activities) of the mobile communications devices. Further, the control module 210 comprises a path control module 210-2 which allocates or defines one or more subsets of the plurality of RFFE components 230-1, 230-2, 230-3 constituting signal paths between the RFICs 220-1, 220-2 and antenna elements (not illustrated) of the mobile communications device. For example, a first subset 230-2 of RFFE components is allocated for constituting one or more signal paths between the first RFIC 220-1 and an antenna element. As indicated in FIG. 2, a plurality of transmit paths for the plurality of transmit chains 221-1 of the first RFIC 220-1 and a plurality of receive paths for the plurality of receive chains 222-1 of the first RFIC 220-1 may, e.g., be allocated or given by the first subset 230-2 and/or the second subset 230-3 of RFFE components. A third subset 230-1 of RFFE components may, e.g., be allocated for constituting one or more signal paths between the second RFIC 220-2 and an antenna element. As indicated in FIG. 2, a plurality of transmit paths for the plurality of transmit chains 221-2 of the second RFIC 220-2 and a plurality of receive paths for the plurality of receive chains 222-2 of the second RFIC 220-2 may be given by the third subset 230-1 of RFFE components.

The path control module 210-2 of the control module 210, e.g., assigns the first subset 230-2 and/or the second subset 230-3 of RFFE components to the first RFIC 220-1, and assigns the third subset 230-1 of RFFE components to the second RFIC 220-2. The RFICs 220-1, 220-2 comprise respective RFIC control modules 223-1, 223-2 for controlling at least a part of the assigned subsets of RFFE components. The RFIC control modules 223-1, 223-2 contain dedicated CPUs 224-1, 224-2 for controlling receive and transmission paths. Furthermore, the RFIC control modules 223-1, 223-2 comprise respective ports for establishing the respective interface 240-1, 240-2 to the BBIC 211 for receiving and/or transmitting a BB signal and control data from/to the BBIC 211. The BB signal is related to a RF signal processed by the RFIC 220-1, 220-2. In some examples, the RF signal may be generated by the RFIC 220-1, 220-2 from the BB signal and transmitted to the antenna via the subset of RFFE components. In some examples, the BB signal may be generated by the RFIC 220-1, 220-2 from an RF signal received from the antenna via the subset of RFFE components. The control data may be provided to the RFIC 220-1, 220-2 in an abstract manner and may be converted to an actual control command for the subset of RFFE components by the RFIC control unit 223-1, 223-2.

The CPUs 224-1, 224-2 of the RFIC control module 223-1, 223-2 are connected to a port for establishing a control interface 250-1, 250-2 between the RFIC 220-1, 220-2 and the BBIC 211 via an arbiter 225-1, 225-2. The BBIC 211 comprises a RFFE control unit 212 for controlling the plurality of RFFE components 230-1, 230-2, 230-3. The RFIC 210-1, 210-2 supplies a control command for at least one of the part of the assigned subset of the plurality of electronic devices to the RFFE control unit 212. For example, the RFIC 210-1 supplies a control command for a RFFE component of the first subset 230-2 of RFFE components to the RFFE control unit 212 via the control interface 250-1.

For generating the control command, the first RFIC 210-1 comprises a first firmware 226-1 which is executed by the CPU 224-1 of the RFIC control unit 223-1. The first firmware 226-1 comprises a transmit firmware component 227-1 for controlling, e.g., RFFE components of the first subset 230-2 of RFFE components which are related to transmitting a RF signal from the first RFIC 220-1 to an antenna element, and a receive firmware component 228-1 for controlling, e.g., RFFE components of the first subset 230-2 of RFFE components which are related to receiving a RF signal from an antenna element. For example, the transmit firmware component 227-1 may control a signal power of the RF signal provided to the antenna element (e.g. by controlling a gain of PA), and the receive firmware component 228-1 may control a signal power of the RF signal received from the antenna element (e.g. by controlling a gain of LNA).

The RFFE control unit 212 receives the control command from the RFIC 220-1, 220-2 via the control interface 250-1, 250-2 and supplies a signal related to the control command to the RFFE component of the subset 230-1, 230-2, 230-3 assigned to the RFIC 220-1, 220-2. The RFFE control unit 212 may comprises one or more interfaces 260 to the plurality of RFFE components 230-1, 230-2, 230-3. The interfaces 260 are connected via a RFFE arbiter/router 214 to the control interface 250-1, 250-2 and the RF control CPU 213. For example, the interface to the RFFE components may be a general-purpose input/output (GPIO) or a RFFE bus as standardized by MIPI alliance.

As indicated by line 270, the path control module 210-2 may also control a part of the subset 230-1, 230-2, 230-3 of RFFE components assigned to the RFIC 220-1, 220-2 via the RFFE control unit 212. For example, if the first subset 230-2 comprises a plurality of switches for connecting two or more of the remaining RFFE components of the first subset 230-2, the switches may receive control commands directly by the RFFE control unit 212 in order to allocate the one or more signal paths from the first RFIC 220-1 to the antenna. For example, the path control module 210-2 executed by the RF control CPU 213 may generate control commands for the switches of the first subset 230-2 and provide the control commands via the RFFE arbiter/router 214 to the interfaces 260. The remaining RFFE components of the first subset 230-2 are controlled by the first RFIC 220-1 via the RFFE control unit 212.

The control module 210 allows to select a subset of the plurality of RFFE components 230-1, 230-2, 230-3, whereas the actual control of at least a part of the selected subset is carried out by the RFIC 220-1, 220-2. Since the signal path constituted by the subset of the plurality of RFFE components is determined by the control module 210, communication between the two RF ICs 220-1 and 220-1 for negotiating control on individual ones of the plurality of RFFE components 230-1, 230-2, 230-3 may be avoided. Accordingly, RFIC 220-1 may require no information on activities of RFIC 220-2, and vice versa. Moreover, an abstract interface 240-1, 240-2 may be used between the RFIC 220-1, 220-2 and the BBIC 211 for providing control information for the assigned subset of RFFE components since the actual control of at least a part of the subset 230-2, 230-3 of RFFE components is performed by the RFIC control unit 223-1, 223-2 of the RFIC 220-1, 220-2. Accordingly, the actual control of the subset 230-2, 230-3 of RFFE components may be carried out by the RFIC 220-1, 220-2 based on abstract control commands provided by the BBIC 211. That is, a clean separation between BB and RF may be enabled by the system 200. Furthermore, supplying control signals to the RFFE components via the RFFE control unit 212 may avoid physical connections from each RFIC to each RFFE component. On the contrary, only a single physical connection to the RFFE control unit 212 is necessary for each of the plurality RFFE component. A complexity of the system may thus be reduced. Hence, the system 200 may allow to control the plurality of RFFE components in an efficient manner.

In other words, FIG. 2 may illustrate a possible system architecture for implementing a layered RFFE control. There may be a central FW component—called "Central RF Control Firmware" in FIG. 2—gathering all planned RF activities from all active Radio Access Technologies (RAT)/ SIMs in a central data base. In the system illustrated FIG. 2 this firmware component runs on a dedicated CPU called "Central RF control CPU", but it is irrelevant where it runs. All RFFE components may be accessible by all RFIC instances (here RFIC#1 and RFIC#2) and a BBIC. In the architecture of FIG. 2 the RFIC may have a dedicated interface towards the BBIC used for routing RFFE control commands to the BBIC. In the BBIC this commands may be directly routed by hardware (e.g. a RFFE arbiter/router) to either a RFFE or a GPIO interface to realize a fast, low latency and low jitter interface.

The layered RFFE control may be implemented by a layer "FE-Path control", which is the central RF control firmware in the BBIC. It may have a sub-module taking care about controlling all RF front-end switches and therewith the path of the reception or the transmission signal through the front-end. For a reception or transmission of a signal from/to a certain RAT there may exist several FE paths. The right path may only be selected with knowledge about the other SIM/RAT activities or even planned activities or even potential activities. That's why this module may be directly connected to the central data base. Controlling the FE path is not timing critical and just needs to be finalized before the corresponding activity is triggered by the RAT. The layer FE path control may inform the RFICs about the configured FE path. That is, PA and DCDC components or an external LNA may be assigned to a certain RFIC and an associated chain within the RFIC.

A layer "TX power control" may contain a transmit (TX) firmware executed by the RFIC (may run on a dedicated TX CPU). This TX firmware may encapsulate all RF TX related functionality, especially the realization of the network or UE higher layer requested TX output power. Especially for 3G the availability of the power request and its execution is very time critical. By not distributing TX power control over many components, the RFIC TX firmware may allow low latency access to PA and DCDC.

A layer "RX gain control" may contain a RX firmware executed by the RFIC (may run on a dedicated RX CPU). The RX firmware may encapsulate all RF RX related functionality, especially the realization of the RX gain requested by an automatic gain control loop that may run in RFIC or BBIC. The gain may be realized by different gain stages, whereas all gain stages shall switch as synchronous as possible. Accordingly, the layer "RX gain control" may allow to satisfy the high requirements to the accuracy of the RX RFFE control.

The system 200 may comprise one or more additional optional features corresponding to one or more aspects of the proposed concept or one or more examples described below.

Figure 3:
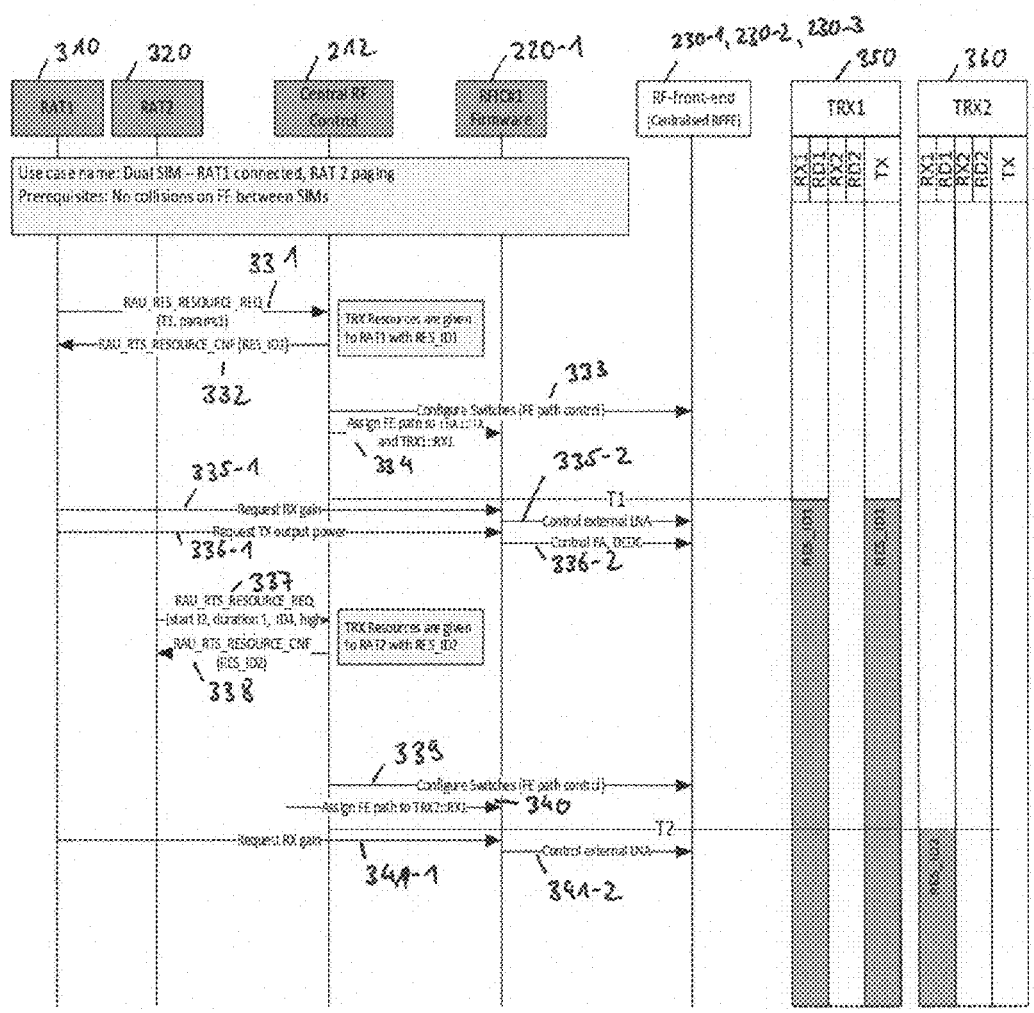
FIG. 3 illustrates an example of a message sequence chart.

FIG. 3 illustrates an example of a message sequence chart 300 for the system 200 illustrated in FIG. 2. In FIG. 3, a situation is illustrated where two SIMs are active in a mobile communications device. The system 200 shall avoid collisions on mastership on RFFE components of the mobile communications device.

A first RAT 310 (RAT1, related to a first of the two SIMs) is requesting transmit and receive resources from RFFE control unit 212 in a step 331. The RFFE control unit 212 confirms the resources in a step 332 and configures in a step 333 switches within the plurality of RFFE components 230-1, 230-2, 230-3 to allocate at least one first signal path 350 to an antenna element of the mobile communications device. The RFFE components of the at least one first signal path 350 are assigned to a first RFIC 220-1 of the mobile communications device in a step 334, so that the RFIC 220-1 controls the RFFE components of the at least one first signal path 350 from a time T1 on. The first RAT 310 requests a specific gain for a receive path among the at least one first signal path 350 from the first RFIC 220-1 in a step 335-1. The first RFIC 220-1 accordingly controls a LNA within the RFFE components of the at least one first signal path 350 in a step 335-2. Further, the first RAT 310 requests a specific output power for a transmit path among the at least one first signal path 350 from the first RFIC 220-1 in a step 336-1. The first RFIC 220-1 accordingly controls a PA and a DCDC (supplying the PA with power) within the RFFE components of the at least one first signal path 350 in a step 336-2. For example, the first RFIC 220-1 may control the assigned RFFE components indirectly via the RFFE control module 212 of BBIC 211 as illustrated in FIG. 2. This may allow low latency and jitter for the control of the RFFE components.

A second RAT 320 (RAT2, related to the second SIM) requests transmit and receive resources to a later time instant from the RFFE control unit 212 in a step 337. The RFFE control unit 212 confirms the resources in a step 338 and configures in a step 339 switches within the plurality of RFFE components 230-1, 230-2, 230-3 to allocate at least one second signal path 360 to an antenna element of the mobile communications device. The RFFE components of the at least one second signal path 360 are assigned to the first RFIC 220-1 in a step 340, so that the RFIC 220-1 controls the RFFE components of the at least one second signal path 360 from a time T2 on. The second RAT 320 requests a specific gain for a receive path among the at least one second signal path 360 from the first RFIC 220-1 in a step 341-1. The first RFIC 220-1 accordingly controls a LNA within the RFFE components of the at least one second signal path 360 in a step 341-2. For example, the first RFIC 220-1 may control the assigned RFFE components indirectly via the RFFE control module 212 of BBIC 211 as illustrated in FIG. 2.

The message sequence chart of FIG. 3 illustrates that collisions on mastership on RFFE components of the mobile communications device may be avoided since signal paths are allocated centrally by the RFFE control unit 212, whereas the actual control of the RFFE components of the signal paths is carried out by a RFIC.

In other words, FIG. 3 shows an example of a possible message sequence chart for the architecture given in FIG. 2. RAT1 may request a resource (RX and TX) for a connection from the Central RF Control unit. The resource may be confirmed giving a certain ID. The FE path control part of the Central RF Control may take care to configure all FE switches according to the use case and may inform the RFIC(s) about the selected path. This may make the RFIC aware of which PA/DCDC or external LNA is associated with the used receive or transmit chain. The RAT may now control the receive or transmit chain by requesting transmit power or receive gain from the RFIC. The RFIC may access the associated front-end components indirectly via the BBIC hardware bridge with low latency and low jitter.

Figure 4:
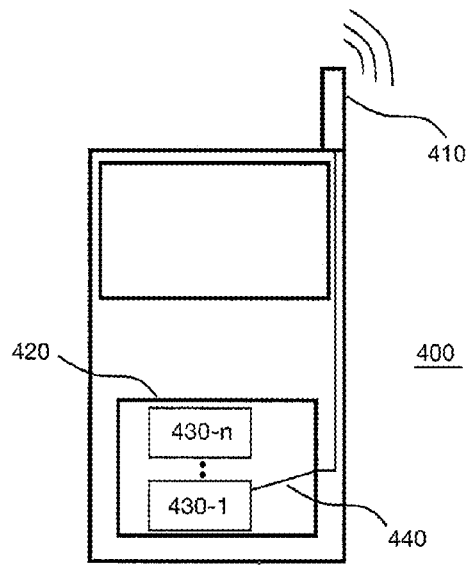
FIG. 4 illustrates an example of a mobile communications device comprising a system for controlling a plurality of electronic components arbitrarily assignable to a plurality of integrated circuits of a mobile communications device.

An example of an implementation using control of a plurality of electronic components arbitrarily assignable to a plurality of ICs of a mobile communications device according to one or more aspects of the proposed concept or one or more examples described above is illustrated in FIG. 4. FIG. 4 schematically illustrates an example of a mobile communications device or mobile phone or user equipment 400 comprising a system 420 for controlling a plurality of electronic components arbitrarily assignable to a plurality of ICs 430-1, . . . , 430-n of the mobile communications device

400 according to an example described herein. A subset of the plurality of electronic components constitutes at least one signal path 440 between the IC 430-1 of the plurality of ICs 430-1, . . . , 430-*n* and an antenna element 410 of the mobile communications device 400. To this end, mobile communications devices may be provided allowing reduced system complexity and avoiding communication (arbitration) between the ICs.

Figure 5:
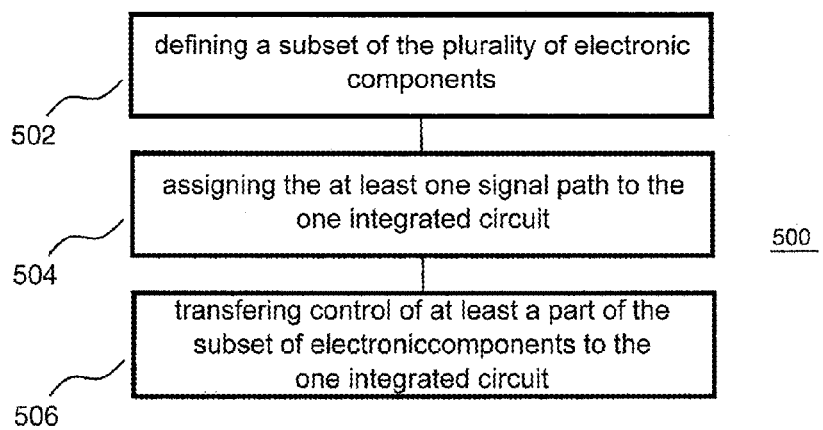
FIG. 5 illustrates a flowchart of an example of a method for controlling a plurality of electronic components arbitrarily assignable to a plurality of integrated circuits of a mobile communications device.

An example of a method 500 for controlling of a plurality of electronic components arbitrarily assignable to a plurality of ICs of a mobile communications device is illustrated by means of a flowchart in FIG. 5. Each of the plurality of ICs is capable of processing a RF signal. The method comprises allocating 502, by a control module, a subset of the plurality of electronic components constituting at least one signal path between one of the plurality of ICs and an antenna element of the mobile communications device. Further, the method comprises assigning 504, by the control module, the at least one signal path to the one IC. The method further comprises transferring 506, by the control module, control of at least a part of the subset of the plurality of electronic components constituting the signal path to the one IC.

More details and aspects of the method are mentioned in connection with the proposed concept or one or more examples described above (e.g. FIGS. 1-4). The method may comprise one or more additional optional features corresponding to one or more aspects of the proposed concept or one or more examples described above.

Figure 6:
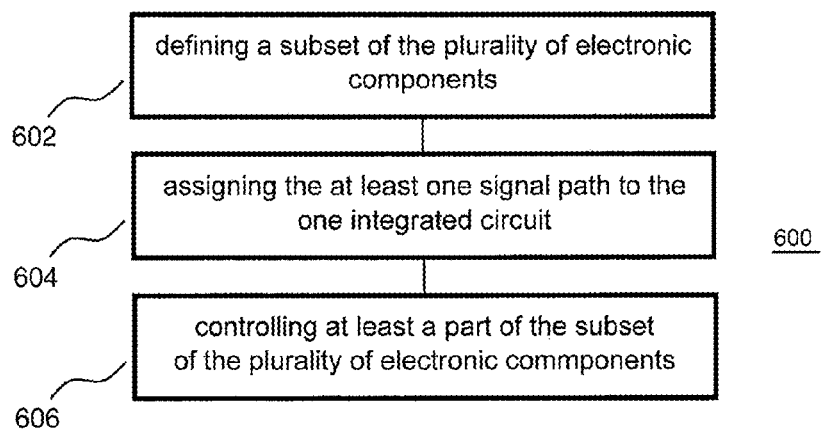
FIG. 6 illustrates a flowchart of another example of a method for controlling a plurality of electronic components arbitrarily assignable to a plurality of integrated circuits of a mobile communications device.

Another example of a method 600 for controlling of a plurality of electronic components arbitrarily assignable to a plurality of ICs of a mobile communications device is illustrated by means of a flowchart in FIG. 6. Each of the plurality of ICs is capable of processing a RF signal. The method comprises allocating 602, by a control module, a subset of the plurality of electronic components constituting at least one signal path between one of the plurality of ICs and an antenna element of the mobile communications device. Further, the method comprises assigning 604, by the control module, the at least one signal path to the one IC. The method further comprises controlling 606 at least a part of the subset of the plurality of electronic components constituting the signal path by the one IC.

More details and aspects of the method are mentioned in connection with the proposed concept or one or more examples described above (e.g. FIGS. 1-4). The method may comprise one or more additional optional features corresponding to one or more aspects of the proposed concept or one or more examples described above.

The examples as described herein may be summarized as follows:

Example 1 is a method for controlling a plurality of electronic components arbitrarily assignable to a plurality of integrated circuits of a mobile communications device to process a radio frequency signal, the method comprising: allocating, by a control module, a subset of the plurality of electronic components constituting at least one signal path between an integrated circuit of the plurality of integrated circuits and an antenna element of the mobile communications device; assigning, by the control module, the at least one signal path to the integrated circuit; and transferring, by the control module, control of at least a part of the subset of the plurality of electronic components constituting the at least one signal path to the integrated circuit.

In example 2, allocating the subset of the plurality of electronic components of example 1 is based on presently used transmit and receive resources within the mobile communications device.

In example 3, allocating the subset of the plurality of electronic components of examples 1 or 2 is based on scheduled transmit and receive resources within the mobile communications device.

In example 4, allocating the subset of the plurality of electronic components of any of examples 1 to 3 is based on transmit and receive resources supported by the mobile communications device.

In example 5, in any of examples 1 to 4, the subset of the plurality of electronic components comprises a plurality of switches, and wherein allocating the subset of the plurality of electronic components constituting the at least one signal path comprises connecting the remaining electronic components of the subset of the plurality of electronic components to the integrated circuit and the antenna element by the plurality of switches of the subset.

In example 6, the method of any of examples 1 to 5 optionally further comprises controlling the part of the subset of the plurality of electronic components constituting the at least one signal path by the integrated circuit.

In example 7, the integrated circuit of example 6 is capable of processing a radio frequency signal is configured to generate a first radio frequency signal, wherein the subset of the plurality of electronic components comprises at least one first amplifier configured to amplify the first radio frequency signal, and wherein controlling the part of the subset of the plurality of electronic components comprises controlling a gain of the first amplifier.

In example 8, in the method of example 7, controlling the gain of the first amplifier comprises controlling a supply voltage for the first amplifier.

In example 9, in the method of example 8, the subset of the plurality of electronic components comprises at least one power supply configured to generate the supply voltage for the first amplifier, and wherein controlling the supply voltage for the first amplifier comprises controlling the supply voltage generated by the power supply.

In example 10, in the method of any of examples 6 to 9, the integrated circuit is configured to receive a second radio frequency signal from the at least one signal path, wherein the subset of the plurality of electronic components comprises at least one second amplifier configured to amplify the second radio frequency signal, and wherein controlling the part of the subset of the plurality of electronic components comprises controlling a gain of the second amplifier.

In example 11, in the method of any of examples 1 to 10, the subset of the plurality of electronic components comprises at least one of a duplexer, a diplexer, a triplexer, a quadriplexer, a frequency filter, and an impedance matching circuit.

In example 12, in the method of any of examples 1 to 11, the control module is comprised by a baseband integrated circuit configured to process a baseband signal related to the radio frequency signal.

Example 13 is a method for controlling a plurality of electronic components arbitrarily assignable to a plurality of integrated circuits of a mobile communications device to process a radio frequency signal, the method comprising: allocating, by a control module, a subset of the plurality of electronic components constituting at least one signal path between an integrated circuit of the plurality of integrated circuits and an antenna element of the mobile communications device; assigning, by the control module, the at least one signal path to the integrated circuit; and controlling at least a part of the subset of the plurality of electronic components constituting the at least one signal path by the integrated circuit.

In example 14, in the method of example 13, allocating the subset of the plurality of electronic components is based on presently used transmit and receive resources within the mobile communications device.

In example 15, in the method of example 13 or example 14, allocating the subset of the plurality of electronic components is based on scheduled transmit and receive resources within the mobile communications device.

In example 16, in the method of any of examples 13 to 15, allocating the subset of the plurality of electronic components is based on transmit and receive resources supported by the mobile communications device.

In example 17, in the method of any of examples 13 to 16, the subset of the plurality of electronic components comprises a plurality of switches, and wherein allocating the subset of the plurality of electronic components constituting the at least one signal path comprises connecting the remaining electronic components of the subset of the plurality of electronic components to the one integrated circuit and the antenna element by the plurality of switches of the subset.

In example 18, in the method of any of examples 13 to 17, the integrated circuit is configured to generate a first radio frequency signal, wherein the subset of the plurality of electronic components comprises at least one first amplifier configured to amplify the first radio frequency signal, and wherein controlling the part of the subset of the plurality of electronic components comprises controlling a gain of the first amplifier.

In example 19, in the method of example 18, controlling the gain of the first amplifier comprises controlling a supply voltage for the first amplifier.

In example 20, in the method of example 19, the subset of the plurality of electronic components comprises at least one power supply configured to generate the supply voltage for the first amplifier, and wherein controlling the supply voltage for the first amplifier comprises controlling the supply voltage generated by the power supply.

In example 21, in the method of any of examples 13 to 20, the integrated circuit is configured to receive a second radio frequency signal from the at least one signal path, wherein the subset of the plurality of electronic components comprises at least one second amplifier configured to amplify the second radio frequency signal, and wherein controlling the part of the subset of the plurality of electronic components comprises controlling a gain of the second amplifier.

In example 22, in the method of any of examples 13 to 21, the subset of the plurality of electronic components comprises at least one of a duplexer, a diplexer, a triplexer, a quadriplexer, a frequency filter, and an impedance matching circuit.

In example 23, in the method of any of examples 13 to 22, the control module is comprised by a baseband integrated circuit configured to process a baseband signal related to the radio frequency signal.

Example 24 is a computer readable storage medium having stored thereon a program having a program code for performing the method of any of examples 1 to 23, when the program is executed on a computer or processor.

Example 25 is a computer program having a program code configured to perform the method of any of examples 1 to 23, when the computer program is executed on a computer or processor.

Example 26 is a system for controlling a plurality of electronic components arbitrarily assignable to a plurality of integrated circuits of a mobile communications device to process a radio frequency signal, the system comprising: a control module configured to allocate a subset of the plurality of electronic components constituting at least one signal path between an integrated circuit of the plurality of integrated circuits and an antenna element of the mobile communications device, wherein the control module is configured to assign the at least one signal path to the integrated circuit, and wherein the control module is configured to transfer control of at least a part of the subset of the plurality of electronic components constituting the at least one signal path to the integrated circuit.

In example 27, in the system of example 26, the control module is configured to allocate the subset of the plurality of electronic components based on presently used transmit and receive resources within the mobile communications device.

In example 28, in the system of example 26 or example 27, the control module is configured to allocate the subset of the plurality of electronic components based on scheduled transmit and receive resources within the mobile communications device.

In example 29, in the system of example 26, example 27 or example 28, the control module is configured to allocate the subset of the plurality of electronic components based on transmit and receive resources supported by the mobile communications device.

In example 30, in the system of any of examples 26 to 29, the subset of the plurality of electronic components comprises a plurality of switches, and the control module is configured to control the plurality of switches of the subset to connect the remaining electronic components of the subset of the plurality of electronic components to the integrated circuit and the antenna element.

In example 31 in the system of any of examples 26 to 30, the integrated circuit is configured to control the part of the subset of the plurality of electronic components constituting the at least one signal path.

In example 32, in the system of example 31, the integrated circuit is configured to generate a first radio frequency signal, and the subset of the plurality of electronic components comprises at least one first amplifier configured to amplify the first radio frequency signal, and wherein the integrated circuit is configured to control a gain of the first amplifier.

In example 33, in the system of example 32, the integrated circuit is configured to control the gain of the first amplifier by controlling a supply voltage for the first amplifier.

In example 34, in the system of example 33, the subset of the plurality of electronic components comprises at least one power supply configured to generate the supply voltage for the first amplifier, and the integrated circuit is configured to control the supply voltage generated by the power supply.

In example 35, in the system of any of examples 31 to 34, the integrated circuits is configured to receive a second radio frequency signal from the at least one signal path, the subset of the plurality of electronic components comprises at least one second amplifier configured to amplify the second radio frequency signal, and the integrated circuit is configured to control a gain of the second amplifier.

In example 36, in the system of any of examples 26 to 35, the subset of the plurality of electronic components comprises at least one of a duplexer, a diplexer, a triplexer, a quadriplexer, a frequency filter, and an impedance matching circuit.

In example 37, the system of any of examples 26 to 36, further optionally comprises a baseband integrated circuit configured to process a baseband signal related to the radio frequency signal, wherein the control module is comprised by the baseband integrated circuit.

In example 38, in the system of example 37, the control module is firmware executed by the baseband integrated circuit.

In example 39, in the system of example 37 or example 38, the subset of the plurality of electronic components are connected to the baseband integrated circuit, wherein the integrated circuit is configured to supply a control command for one of the part of the subset of the plurality of electronic components to the baseband integrated circuit, and wherein the baseband integrated circuit is configured to supply a control signal related to the control command to the one of the part of the subset of the plurality of electronic components.

In example 40, in the system of any of examples 26 to 36, the one of the plurality of integrated circuits is one of a transmitter, a receiver and a transceiver.

Example 41 is a system for controlling a plurality of electronic components arbitrarily assignable to a plurality of integrated circuits of a mobile communications device, each of the plurality of integrated circuits being capable of processing a radio frequency signal, the system comprising: a control module configured to allocate a subset of the plurality of electronic components constituting at least one signal path between an integrated circuit of the plurality of integrated circuits and an antenna element of the mobile communications device, wherein the control module is configured to assign the at least one signal path to the integrated circuit, and wherein the integrated circuit is configured to control at least a part of the subset of the plurality of electronic components constituting the at least one signal path.

In example 42, in the system of example 41, the control module is configured to allocate the subset of the plurality of electronic components based on presently used transmit and receive resources within the mobile communications device.

In example 43, in the system of example 41 or example 42, the control module is configured to allocate the subset of the plurality of electronic components based on scheduled transmit and receive resources within the mobile communications device.

In example 44, in the system of example 41, example 42 or example 43, the control module is configured to allocate the subset of the plurality of electronic components based on transmit and receive resources supported by the mobile communications device.

In example 45, in the system of any of examples 41 to 44, the subset of the plurality of electronic components comprises a plurality of switches, and the control module is configured to control the plurality of switches of the subset to connect the remaining electronic components of the subset of the plurality of electronic components to the integrated circuit and the antenna element.

In example 46, In the system of any of examples 41 to 45, the one of the plurality of integrated circuits being capable of processing a radio frequency signal is configured to generate a first radio frequency signal, the subset of the plurality of electronic components comprises at least one first amplifier configured to amplify the first radio frequency signal, and the integrated circuit is configured to control a gain of the first amplifier.

In example 47, in the system of example 46, the integrated circuit is configured to control the gain of the first amplifier by controlling a supply voltage for the first amplifier.

In example 48, in the system of example 47, the subset of the plurality of electronic components comprises at least one power supply configured to generate the supply voltage for the first amplifier, and wherein the integrated circuit is configured to control the supply voltage generated by the power supply.

In example 49, in the system of any of examples 41 to 48, the one of the plurality of integrated circuits being capable of processing a radio frequency signal is configured to receive a second radio frequency signal from the at least one signal path, the subset of the plurality of electronic components comprises at least one second amplifier configured to amplify the second radio frequency signal, and the integrated circuit is configured to control a gain of the second amplifier.

In example 50, in the system of any of examples 41 to 50, the subset of the plurality of electronic components comprises at least one of a duplexer, a diplexer, a triplexer, a quadriplexer, a frequency filter, and an impedance matching circuit.

In example 51, the system of any of examples 41 to 51, further optionally comprises a baseband integrated circuit configured to process a baseband signal related to the radio frequency signal, wherein the control module is comprised by the baseband integrated circuit.

In example 52, in the system of example 51, the control module is firmware executed by the baseband integrated circuit.

In example 53, in the system of example 51 or example 52, the subset of the plurality of electronic components is connected to the baseband integrated circuit, wherein the integrated circuit is configured to supply a control command for one of the part of the subset of the plurality of electronic components to the baseband integrated circuit, and wherein the baseband integrated circuit is configured to supply a control signal related to the control command to the one of the part of the subset of the plurality of electronic components.

In example 54, in the system of any of examples 41 to 53, the integrated circuit is one of a transmitter, a receiver and a transceiver.

Example 55 is a mobile communications device comprising a system according to any of examples 26 to 54.

Example 56 is a means for controlling a plurality of electronic components arbitrarily assignable to a plurality of integrated circuits of a mobile communications device to process a radio frequency signal, the means comprising: a means for allocating a subset of the plurality of electronic components constituting at least one signal path between one of the plurality of integrated circuits and an antenna element of the mobile communications device, wherein the means for allocating is configured to assign the at least one signal path to the integrated circuit, and wherein the means for allocating is configured to transfer control of at least a part of the subset of the plurality of electronic components constituting the at least one signal path to the integrated circuit.

In example 57, in the means of example 56, the means for allocating is configured allocate the subset of the plurality of electronic components based on presently used transmit and receive resources within the mobile communications device.

In example 58, in the means of example 56 or example 57, the means for allocating is configured to allocate the subset of the plurality of electronic components based on scheduled transmit and receive resources within the mobile communications device.

In example 59, in the means of any of examples 56 to 58, the means for allocating is configured to allocate the subset of the plurality of electronic components based on transmit and receive resources supported by the mobile communications device.

Example 60 is a means for controlling a plurality of electronic components arbitrarily assignable to a plurality of integrated circuits of a mobile communications device to process a radio frequency signal, the means comprising: a means for allocating a subset of the plurality of electronic components constituting at least one signal path between an integrated circuit of the plurality of integrated circuits and an antenna element of the mobile communications device, wherein the means for allocating is configured to assign the at least one signal path to the integrated circuit, and wherein the integrated circuit is configured to control at least a part of the subset of the plurality of electronic components constituting the at least one signal path.

In example 61, in the means of example 60, the means for allocating is configured to allocate the subset of the plurality of electronic components based on presently used transmit and receive resources within the mobile communications device.

In example 62, in the means of example 60 or example 61, the means for allocating is configured to allocate the subset of the plurality of electronic components based on scheduled transmit and receive resources within the mobile communications device.

In example 63, in the means of any of examples 60 to 62, the means for allocating is configured to allocate the subset of the plurality of electronic components based on transmit and receive resources supported by the mobile communications device.

Examples may further provide a computer program having a program code for performing one of the above methods, when the computer program is executed on a computer or processor. A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

What is claimed is:

1. A method for controlling a plurality of electronic components assignable to a plurality of integrated circuits of a mobile communications device to process a radio frequency signal, the method comprising:
   allocating, by a control module, a subset of the plurality of electronic components constituting at least one signal path between an integrated circuit of the plurality of integrated circuits and an antenna element of the mobile communications device;
   assigning, by the control module, the at least one signal path to the integrated circuit; and
   transferring, by the control module, control of at least a part of the subset of the plurality of electronic components constituting the at least one signal path to the integrated circuit.

2. The method of claim 1, wherein allocating the subset of the plurality of electronic components is based on presently used transmit and receive resources within the mobile communications device.

3. The method of claim 1, wherein allocating the subset of the plurality of electronic components is based on scheduled transmit and receive resources within the mobile communications device.

4. The method of claim 1, wherein allocating the subset of the plurality of electronic components is based on transmit and receive resources supported by the mobile communications device.

5. The method of claim 1, wherein the subset of the plurality of electronic components comprises a plurality of switches, and wherein allocating the subset of the plurality of electronic components constituting the at least one signal path comprises connecting the remaining electronic components of the subset of the plurality of electronic components to the integrated circuit and the antenna element by the plurality of switches of the subset.

6. The method of claim 1, further comprising controlling the part of the subset of the plurality of electronic components constituting the at least one signal path by the integrated circuit.

7. The method of claim 6, wherein the integrated circuit is configured to generate a first radio frequency signal, wherein the subset of the plurality of electronic components comprises at least one first amplifier configured to amplify the first radio frequency signal, and wherein controlling the part of the subset of the plurality of electronic components comprises controlling a gain of the first amplifier.

8. The method of claim 7, wherein controlling the gain of the first amplifier comprises controlling a supply voltage for the first amplifier.

9. The method of claim 8, wherein the subset of the plurality of electronic components comprises at least one power supply configured to generate the supply voltage for the first amplifier, and wherein controlling the supply voltage for the first amplifier comprises controlling the supply voltage generated by the power supply.

10. The method of claim 6, wherein the integrated circuit being capable of processing a radio frequency signal is configured to receive a second radio frequency signal from the at least one signal path, wherein the subset of the plurality of electronic components comprises at least one second amplifier configured to amplify the second radio frequency signal, and wherein controlling the part of the subset of the plurality of electronic components comprises controlling a gain of the second amplifier.

11. The method of claim 1, wherein the control module is comprised by a baseband integrated circuit configured to process a baseband signal related to the radio frequency signal.

12. A non-transitory computer readable storage medium having stored thereon a program having a program code for performing the method of claim 1, when the program is executed on a computer or processor.

13. A method for controlling a plurality of electronic components assignable to a plurality of integrated circuits of a mobile communications device to process a radio frequency signal, the method comprising:
   allocating, by a control module, a subset of the plurality of electronic components constituting at least one signal path between an integrated circuit of the plurality of integrated circuits and an antenna element of the mobile communications device;
   assigning, by the control module, the at least one signal path to the integrated circuit; and
   controlling at least a part of the subset of the plurality of electronic components constituting the at least one signal path by the integrated circuit.

14. The method of claim 13, wherein allocating the subset of the plurality of electronic components is based on presently used transmit and receive resources within the mobile communications device.

15. The method of claim 13, wherein allocating the subset of the plurality of electronic components is based on scheduled transmit and receive resources within the mobile communications device.

16. The method of claim 13, wherein allocating the subset of the plurality of electronic components is based on transmit and receive resources supported by the mobile communications device.

17. A system for controlling a plurality of electronic components assignable to a plurality of integrated circuits of a mobile communications device to process a radio frequency signal, the system comprising:
   a control module configured to allocate a subset of the plurality of electronic components constituting at least one signal path between an integrated circuit of the plurality of integrated circuits and an antenna element of the mobile communications device,
   wherein the control module is configured to assign the at least one signal path to the integrated circuit, and
   wherein the control module is configured to transfer control of at least a part of the subset of the plurality of electronic components constituting the at least one signal path to the integrated circuit.

18. The system of claim 17, wherein the control module is configured to allocate the subset of the plurality of electronic components based on presently used transmit and receive resources within the mobile communications device.

19. The system of claim 17, wherein the control module is configured to allocate the subset of the plurality of electronic components based on scheduled transmit and receive resources within the mobile communications device.

20. The system of claim 17, wherein the control module is configured to allocate the subset of the plurality of electronic components based on transmit and receive resources supported by the mobile communications device.

21. The system of claim 17, wherein the subset of the plurality of electronic components comprises a plurality of switches, and wherein the control module is configured to control the plurality of switches of the subset to connect the remaining electronic components of the subset of the plurality of electronic components to the integrated circuit and the antenna element.

22. The system of claim 17, wherein the integrated circuit is configured to control the part of the subset of the plurality of electronic components constituting the at least one signal path.

23. The system of claim 17, further comprising a baseband integrated circuit configured to process a baseband signal related to the radio frequency signal, wherein the control module is comprised by the baseband integrated circuit.

24. The system of claim 23, wherein the subset of the plurality of electronic components are connected to the baseband integrated circuit, wherein the integrated circuit is configured to supply a control command for one of the part of the subset of the plurality of electronic components to the baseband integrated circuit, and wherein the baseband integrated circuit is configured to supply a control signal related to the control command to the one of the part of the subset of the plurality of electronic components.

* * * * *